UNITED STATES PATENT OFFICE.

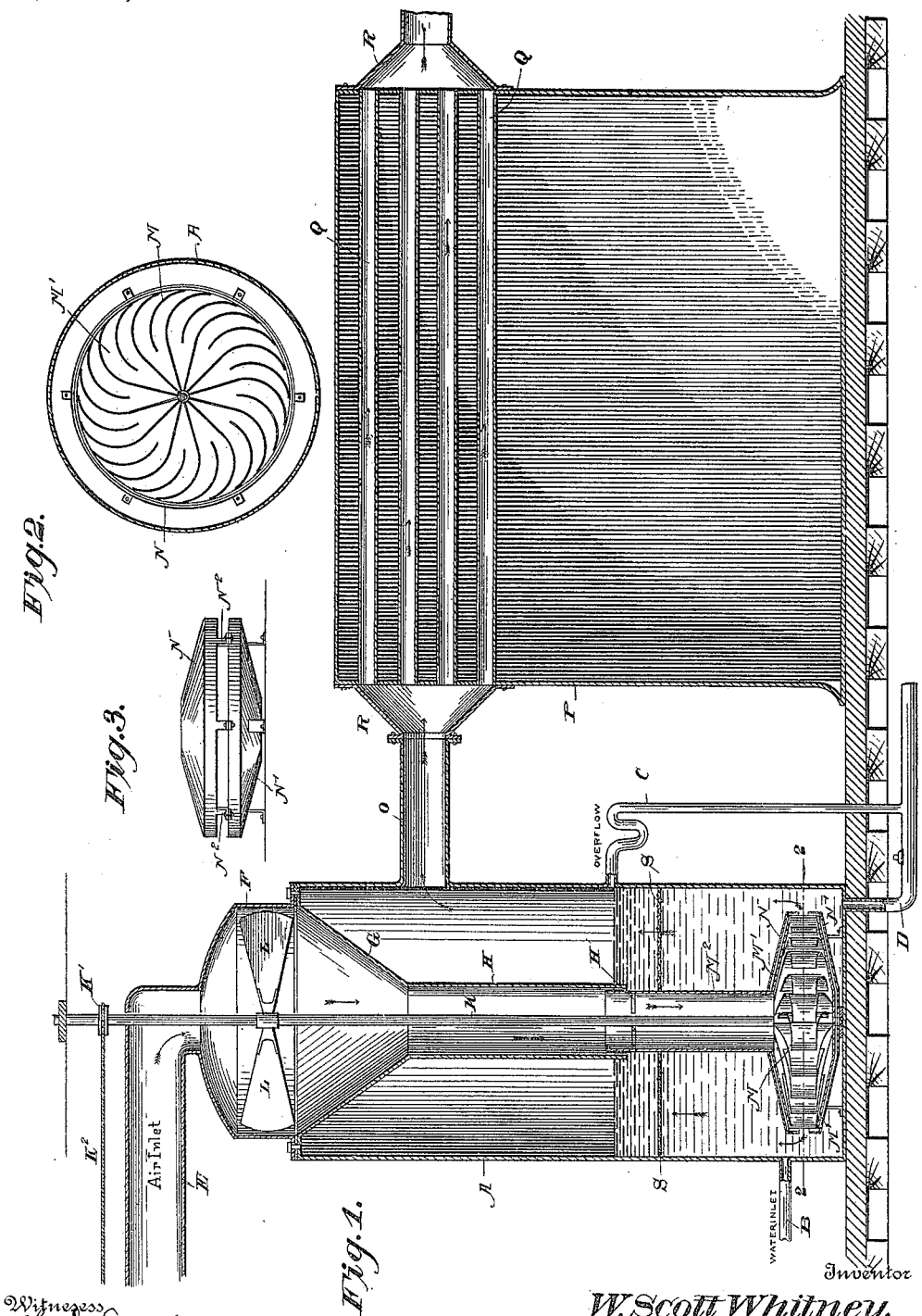

WALTER SCOTT WHITNEY, OF GLENS FALLS, NEW YORK.

AIR-PURIFYING AND VENTILATING SYSTEM.

SPECIFICATION forming part of Letters Patent No. 616,997, dated January 3, 1899.

Application filed November 20, 1897. Serial No. 659,314. (No model.)

*To all whom it may concern:*

Be it known that I, WALTER SCOTT WHITNEY, residing at Glens Falls, in the county of Warren and State of New York, have invented a new and useful Air-Purifying and Ventilating System, of which the following is a specification.

This invention relates to improvements in ventilating and air-purifying systems and the mechanism for effecting such ventilation and purification.

The object sought to be attained by my invention is the purification of the air and means for conducting such purified air to the apartments, chambers, or other locations where necessary.

It is well known that the air near the surface of the earth is impregnated with all manner of impurities and feculent matter held in suspension and invisible to the eye, especially a great variety of bacteria, which remain in the system when inhaled, giving rise to many diseases—such as consumption, malarious fevers, typhoid, &c. Especially in large cities and near manufacturing centers the air is filled with coal-dust, cinders, and other minute substance, rendering it exceedingly deleterious when inhaled. My purpose is to purify such atmosphere by forcing it through water which is pure or approximately pure, with means for the constant changing of such water, thus separating from the air and carrying off all the deleterious matter and organisms found therein.

My improved system is equally adaptable to dwellings, public halls, office-buildings, churches, railway-cars, and steamers and requires but little expenditure of power. It may be constructed and arranged in a great variety of forms to serve the purpose intended, and the cost of application and operation is no greater than the ordinary ventilating appliances, which simply transfer impure air from one point to another without in any way effecting its purification.

In the drawings herewith, in which like parts are indicated by similar letters of reference, I have shown a form of mechanism for effecting the purification of air; but while such mechanism or its equivalent is necessary it is the system of ventilation and purification which I claim as my invention and which I desire to secure by means of Letters Patent.

In the drawings herewith, Figure 1 is a longitudinal vertical section showing the several portions in connection constituting one form of mechanism employed in the purification of air according to my improved system. Fig. 2 is a horizontal section on line 2 2 of Fig. 1. Fig. 3 is a detail view of the casing for the centrifugal air-ejector.

Referring to the drawings by letters, A is a cylindrical reservoir, of galvanized iron or other suitable metal, having a water-supply pipe B, overflow-pipe C, and drain-pipe D, each located, preferably, as shown.

E is an air-inlet pipe leading into a suction-chamber F, said suction-chamber being in a suitable manner connected with the top of reservoir A. Depending from the suction-chamber F within the reservoir A, I provide a funnel-shaped portion G and the lower end H. The upper circular edge of portion G is provided with a marginal flange by which it may be secured upon an inwardly-projected flange on the portion A, and the suction-chamber F is also provided with a marginal flange, so that the three portions may be bolted together and be in hermetical attachment with each other.

Centrally within the reservoir A, I journal a vertical shaft K, its upper end projecting through the surface of pipe E, upon which I mount a suitable band wheel or pulley K' with band K² for rotating the same. Upon said shaft K, within the suction-chamber F, I mount and rigidly secure a vacuum-fan L. Upon the lower end of shaft K, I mount a centrifugal air-injector M, which is inclosed within upper and lower covers M', the form being substantially double convex. Said wheel is substantially of the construction shown in Fig. 2, the radial arms being all curved in the same direction, as shown. Projected upwardly from the upper convex surface of portion M and of integral construction therewith is a cylindrical portion M², somewhat smaller than the depending portion H and adapted to loosely enter same. The cylindrical portion M² is at its upper end maintained in vertical plane by means of an integrally-formed spider or gridiron H', through which the shaft K passes. The centrifugal air-injector M is further inclosed by a double convex casing. (Shown in detail in Fig. 3.) Said casing consists of upper and lower portions N and N', each provided with marginal flanges, from which project tongues N², adapted to overlap each other. This casing is stationary, being by suitable means secured within the bottom of reservoir A. All the parts, as well as those hereinafter mentioned, should be of some non-corrosive metal, like galvanized iron.

Leading from the reservoir A, I provide an enlarged air-pipe O, which at its outer end is properly secured to a flue-chamber P, provided with a plurality of flues Q, having a common inlet R and outlet R'. The said chamber P is provided with a removable top, so that within the chamber may be placed whatever may be necessary to heat or cool the air as it is passing through the flues Q. In winter the chamber may be filled with superheated water and in warm weather with a refrigerative compound. After passing beyond the portion R' the connections may be multiplied and the refined air carried to the points of consumption, however distant.

The operation of my improved system is as follows: The inflow-pipe B and the outflow-pipe C should be of such relative diameters as to insure the confinement of the water to a point even with the outflow connection. The portion H should depend somewhat below the surface of the water, and the portion M² should project somewhat above the surface, so that all the air passing through reservoir A will be subjected to the purifying effect of passage through approximately pure water. The shaft K being rotated, the air will be drawn through the inlet E by means of the suction-fan L and down through G, H, and M² into the centrifugal air-injector M, which also rotating will expel it radially between the upper and lower flanged edges of casing N and N'. The air having no other outlet will thus be forced upwardly through the water in reservoir A, thence into the pipe O, and through the flues Q, being cooled or heated, as the case may be, while passing therethrough. The water being, if possible, constantly changing in the reservoir, the impurities precipitated will be carried off through the overflow-pipe C, while the grosser impurities and sediment may from time to time be drawn off through pipe D.

In order to break the air-bubbles rising in the water, I provide a screen-partition S in a plane slightly below the overflow connection C. By this means the large bubbles will be broken and the purifying effects of the water increased.

When the air passes out of the reservoir A, it will necessarily be very moist, but all the unnecessary moisture will be condensed while passing through the flues Q, thus fitting it for consumption.

It is distinctly understood that while I have described the small details forming in connectional combination my improved system, yet I do not by any means confine myself to such mechanism. For instance, I may employ other means than that shown for creating suction in pipe E, and I may employ another form or any equivalent of the centrifugal air-injector M and other means for propelling the same.

On railroads there may be a special car employed for the purpose of such purification of air and alteration of temperature, or, instead of a separate car, a small compartment in each car would serve the purpose, the water being conducted in hose, and the steam for operating the vacuum-fans supplied in the same manner, or the fan may be propelled by electricity or other force.

Having thus described my invention, its object and mechanism, what I claim, and desire to secure by means of Letters Patent, is—

1. The combination in an air-purifying and ventilating system, of a reservoir adapted to contain water and provided with an outlet above the level of said water, an air-supply pipe extending below the level of water, means for forcing air through said pipe, and a centrifugal air-ejector, located beneath said pipe and adapted to force the air through the water to said outlet, substantially as described.

2. The combination in an air-purifying and ventilating system, of a reservoir adapted to contain water and provided with an outlet above the level of the water, a chamber containing a plurality of flues, a pipe connecting said outlet of the reservoir and the flues, an air-pipe extending below the level of the water in the reservoir, a fan located in said pipe and adapted to force air therethrough, and a centrifugal air-ejector positioned at the lower end of said pipe and adapted to force the air therefrom through the water in the reservoir, substantially as set forth.

3. The combination in an air-purifying and ventilating system, of a reservoir or tank, a water-supply pipe, an overflow-pipe and drain-pipe in connection therewith, an air-supply pipe leading into the top of said reservoir, a fan adapted to force air through said air-pipe, air-conducting cylinders leading downwardly through said reservoir, a centrifugal air-injector mounted in the lower portion of the reservoir below the water-level adapted to expel the air into the water in said reservoir, an air-conducting pipe leading from the reservoir above the water-level, flues in connection with the last-mentioned pipe, a heating or refrigerating chamber inclosing said flues, and a distributing pipe or pipes also in connection with said flues, all substantially as herein shown and set forth.

W. SCOTT WHITNEY.

Witnesses:
 LESTER WHITNEY,
 MELVILLE F. HOWARD.